United States Patent [19]

Boram et al.

[11] 3,720,006

[45] March 13, 1973

[54] TEACHING APPARATUS

[75] Inventors: Frank Boram, Esher; Denis Harold Kail, Banstead, both of England

[73] Assignee: Gerald Barry Stillit, London, England

[22] Filed: Jan. 19, 1971

[21] Appl. No.: 107,715

[30] Foreign Application Priority Data

Jan. 28, 1970 Great Britain..................4,113/70

[52] U.S. Cl. .................................................35/9 C
[51] Int. Cl. ..............................................G09b 7/06
[58] Field of Search ................................35/9 C, 9 R

[56] References Cited

UNITED STATES PATENTS

| | | | |
|---|---|---|---|
| 3,397,466 | 8/1968 | Stillit | 35/9 C |
| 3,100,352 | 8/1963 | Boissevain | 35/9 C |
| 3,522,665 | 8/1970 | Kalt | 35/9 C |

Primary Examiner—Robert W. Michell
Assistant Examiner—J. H. Wolfe
Attorney—Snyder and Butrum

[57] ABSTRACT

A teaching apparatus comprising a printed sheet carrying questions and for each question a number of demarked areas denoting different answers, a platen locatable behind the sheet and bearing a plurality of separate electrically conductive areas registrable with the sheet demarked areas, a probe in circuit with the conductive areas and connectable to an electric energy source, and a multivibrator for applying to the conductive areas at will periodically time-varying signals separable to a receiver T1 and capable of causing from the conductive areas radiation of corresponding electromagnetic waves capable of being sensed in front of the sheet by the probe touching the sheet, the receiver T1 being coupled to the probe to identify the wave picked up thereby and actuating indicating means indicating the correctness of the selected answer.

5 Claims, 3 Drawing Figures

PATENTED MAR 13 1973 3,720,006

INVENTOR
FRANK BORAM
DENIS HAROLD KAIL

TEACHING APPARATUS

BACKGROUND OF THE INVENTION

1. Field of the Invention

This invention relates to teaching apparatus.

2. Description of the Prior Art

It is known to provide teaching apparatus comprising a combination of a printed sheet with at various places on the sheet a set of answers to a question, the sheet including a hole or aperture near each answer in a set, and a platen which lies under the printed sheet and which carries a number of conductive members, a probe which is connected in circuit with signalling means, the arrangement being such that when a particular answer in a set is selected by the insertion of the probe in a particular hole, the probe completes an electric circuit between a conductive member underneath the hole and the signalling means indicates whether the answer is correct or not. The conductive members normally include at least one member which is associated with the holes denoting the correct answers to the questions. If the probe is connected to any hole denoting an incorrect answer to a question no signal will be received, thereby indicating that the answer is incorrect. This form of teaching apparatus suffers from the disadvantage that it is necessary to prepare the printed sheets, which may be single sheets or part of a book, with preformed holes, which is inconvenient and expensive.

A further proposal is to associate the answers with marked areas such as small circles which overlie the conductive members in a manner similar to the overlying of the holes as previously described and to use the probe having a sharp conductive tip with which the marked area is pierced to make contact with the conductive member or layer lying underneath the hole in order to complete an electric circuit as before. This proposal suffers from the disadvantage that the printed paper or card can be irretrievably damaged after a number of piercings especially if the apparatus is used by children who are not always careful in the use of the probe.

The present invention is accordingly directed to an improved form of teaching apparatus with which sets of answers can be provided on a printed sheet and associated with respective demarked areas as before but with which it is unnecessary to provide the printed sheet with holes or to pierce the demarked areas.

SUMMARY

According to the invention, teaching apparatus comprises in combination a printed sheet carrying at least one set, and preferably a plurality of sets of demarked areas, each area in a set denoting a different answer to a question, a platen for location behind the printed sheet and bearing a plurality of separate electrically conductive areas, the sheet and/or the platen being arranged so that when the sheet and platen are in register the area or areas denoting a correct answer or answers are juxtaposed with a respective conductive member or a respective set of conductive members and those demarked areas associated with incorrect answers are juxtaposed with a different conductive area or set of conductive areas, means for applying to the several conductive areas or sets of areas respective periodically time-varying electrical signals which are separable at a receiver and which are capable of causing from the conductive areas radiation of corresponding electromagnetic waves that can be sensed in front of the printed sheet by a pick-up placed adjacent a respective demarked area, a pick-up for the electromagnetic waves and a receiver which is coupled to the pick-up for identifying the signal sensed by the pick-up and including signalling means for indicating the correctness or otherwise of the answer selected by the juxtaposition of the pick-up with a demarked area.

Preferably two conductive areas or two sets of conductive areas are provided and the two electrical signals applied to the areas or sets of areas are square-wave, anti-phase signals. One advantage of this is the cancelling effect of the signals sensed by the pick-up when it is between demarked areas. Moreover, it is easier to separate the signals by a phase comparison with one of the applied signals, using a synchronously operated switch for example rather than using tuned circuits to differentiate between for example signals of different frequency applied to the conductive areas.

DESCRIPTION OF THE PREFERRED EMBODIMENT

Figure 1:
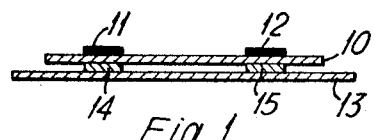
FIG. 1 shows diagrammatically part of a teaching apparatus.

FIG. 1 shows diagrammatically a printed sheet 10 which may be part of an instruction book or may be a separate card. The sheet includes answers to various questions, the answers being grouped in sets each set including a correct answer and one or more incorrect answers. Each answer is adjacent a demarked area such as a small printed circle 11 or 12. In use an answer to a question is selected by placing a pick-up (to be described) close to and preferably immediately over the demarked area associated with the answer.

In use, the printed page or sheet is disposed beneath a platen 13 having a plurality of conductive areas near or on its upper surface. The platen and sheet are preferably separable but may be brought into register by one or more clips or register marks on sheet and platen so that the marked areas 11 and 12 lie immediately over parts of the conductive areas 14 and 15. It will be appreciated that normally each page contains a number of sets of answers and the conductive area associated with the correct answers would be interleaved in any convenient manner with the conductive area or set of conductive areas associated with the demarked areas denoting incorrect answers.

As will be described in more detail hereinafter, electrical time-varying periodic signals are applied to the areas 14 and 15 so as to produce above the printed sheet electromagnetic signals that can be sensed by a suitable pick-up means. Thus by placing a pick-up immediately over the demarked area 11 for example one would pick up a signal corresponding to that applied to the conductive area 14 whereas placing the pick-up immediately over the area 12 one would pick up a signal corresponding to that applied to the conductive area 15. The remainder of the apparatus to be described concerns the means for applying the electrical signals to the conductive areas and receiving the picked up signals the indication of which has been picked up and accordingly the indication of the correctness or otherwise of the answer selected by disposing the probe adjacent one or other of the demarked areas 11 or 12.

Figure 2:
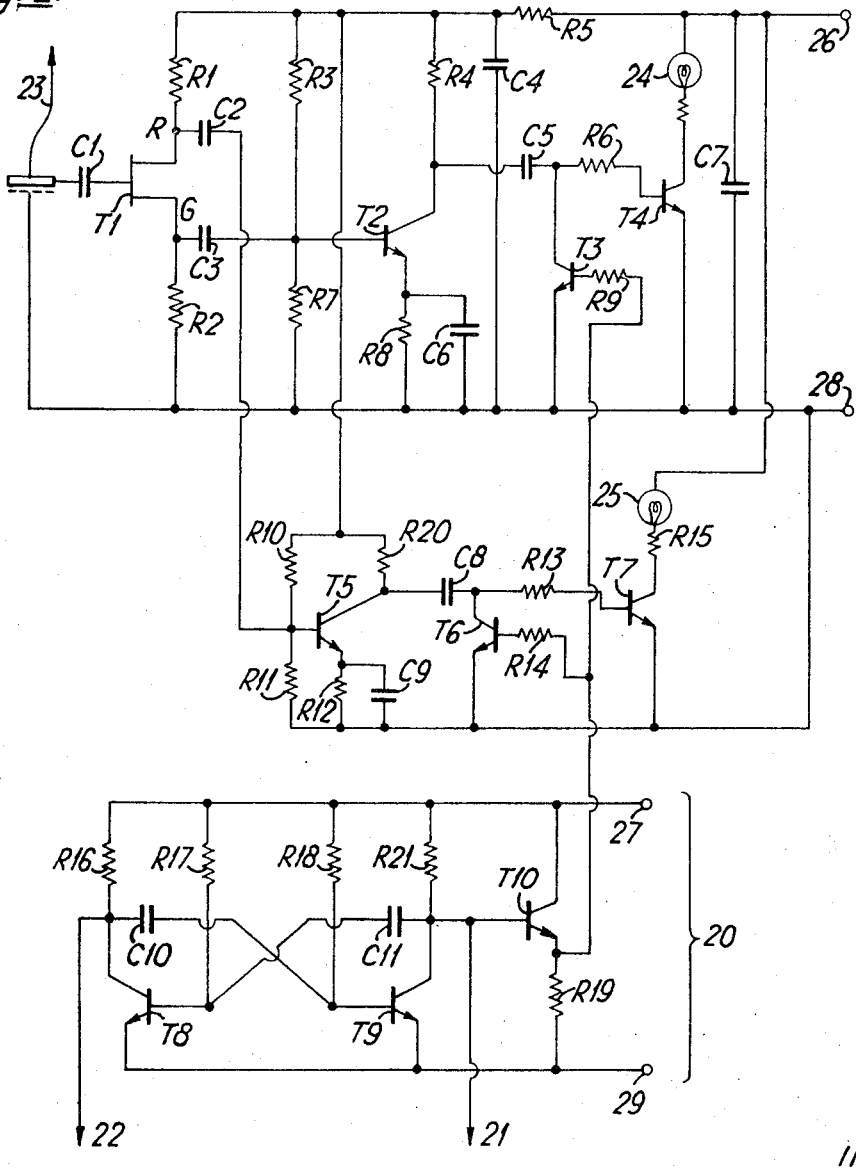
FIG. 2 is a circuit diagram of electrical apparatus forming part of the teaching apparatus of FIG. 1.

Referring now to FIG. 2, a free-running multivibrator 20 generates at two complementary outputs 21 and 22 two anti-phase signals of repetition frequency approximately 16 khz with a mark-to-space ratio of the order of 1 to 10. The signal appearing at the output 21 is shown by the waveform 31 in FIG. 3 whereas the signal appearing at the output 22 is shown by the waveform 32 in FIG. 3. The outputs 21 and 22 are coupled respectively to the conductive areas 14 and 15 of the platen 13.

Also in FIG. 2 is shown a probe 23 which takes the form of a capacitative pick-up for electromagnetic signals. The pick up picks up a signal, depending over which demarked area 11 or 12 it is placed, and feeds the picked up signal to a field effect transistor T1. At two terminals, G and R respectively, of the field effect transistor T1, there appear respectively a signal in phase and a signal out of phase with the signal fed from the probe 23. The in phase signal is amplified by an amplifier comprising essentially a transistor T2. This signal is applied to a synchronous switch operated in phase with one of the signals applied to the conductive areas and the synchronous switch formed by a transistor T3 is switched by a signal of waveform similar to that appearing at the output 21 of the multivibrator. For this purpose the appropriate output of the multivibrator is coupled through a transistor T10 to the base of the transistor T3.

Figure 3:
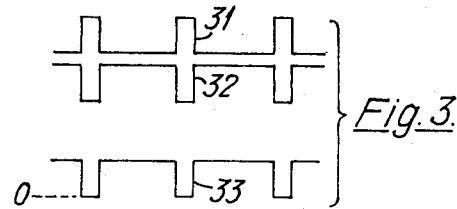
FIG. 3 is a diagram showing waveforms of signals occurring at various parts of the teaching apparatus.

The synchronous switching of the transistor T3 is caused to effect the clamping of the collector of the transistor, and accordingly the line on which the in phase received signal appears, to zero volts for the periods corresponding to the "marks" of the waveform 31. When the signal sensed by the pick-up produces at the collector of the transistor T2 a waveform 180° out of phase with the waveform at the base of the transistor T3 a signal of the form shown by the waveform 33 in FIG. 3 is applied to the transistor T4 of which the base is coupled to the collector of the transistor T3 through a coupling resistor. If in fact this waveform appears at the transistor T4 the transistor T4 will substantially continuously conduct and a green lamp 24 will be illuminated.

In a similar manner the signal at the output R of the transistor T1 is amplified by a transistor T5 and applied to a synchronous switch formed by a transistor T6 also coupled to the output 21 of the multivibrator 20, so as to cause the transistor T7 to conduct and a red lamp 25 to be illuminated when signals denoting an incorrect answer are sensed by the pick-up.

The synchronous switches accordingly form a means for identifying the phase of the received signals using one of the signals applied to the conductive areas as a reference.

The circuit shown in FIG. 2 requires the correct values of the integers thereof and a satisfactory circuit is that of FIG. 2 in which the various integers have the values in the following Table:

TABLE

Inputs  26 +9 volts
        27 +9 volts
Terminals  28 zero volts
           29 zero volts

| Capacitors (in μF) | | Resistors (in ohms) | | | |
|---|---|---|---|---|---|
| C1 | 82 | R1 | 330 | R11 | 18k |
| C2 | 0.01 | R2 | 330 | R12 | 1,000 |
| C3 | 0.01 | R3 | 100k | R13 | 3,900 |
| C4 | 100 | R4 | 2,200 | R14 | 1,000 |
| C5 | 0.1 | R5 | 22 | R15 | 10 |
| C6 | 100 | R6 | 3,900 | R16 | 1,000 |
| C7 | 100 | R7 | 18k | R17 | 82k |
| C8 | 100 | R8 | 1,000 | R18 | 82k |
| C9 | 100 | R9 | 1,000 | R19 | 1,000 |
| C10 | 100 | R10 | 100k | R20 | 2,200 |
| C1 | 1,000 | | | R21 | 1,000 |

The voltage supply to the inputs can be any suitable source of electric energy preferably an electric dry battery conveniently the batteries, indicating means such as lamps or projectable plungers, and the circuit of FIG. 2 are mounted in a housing which preferably is mounted on one end of the platen outside the platen zone bearing the conductive areas.

We claim:
1. A teaching apparatus comprising, in combination:
   a printed sheet having at least one question thereon and at least a pair of demarked areas each denoting a different answer to said question;
   a platen locatable in substantial registry with said sheet and on one side thereof;
   at least a pair of electrically conductive areas on said platen each of said conductive areas being in juxtaposition with each of said demarked areas, respectively, when said platen is in registry with said sheet;
   means for energizing one of said conductive areas to radiate time-varying electromagnetic energy of one phase, and means for energizing the other of said conductive areas to radiate time-varying electromagnetic energy of a second phase, whereby the energy radiated by said one conductive area is out of phase with respect to the energy radiated by said other conductive area, said conductive areas being separated sufficiently to prevent ambiguity of radiated energy at said demarked areas;
   pick up means selectively positionable adjacent either of said demarked areas on the opposite side of said sheet for receiving the electromagnetic energy radiated therethrough and including output means for producing a time-varying electrical signal corresponding in phase with the electromagnetic energy received;
   plural indicator means for indicating the correctness of the answer corresponding to the possible different answers to said question;
   phase comparison means connected to said output means of said pick up means for energizing said indicator means according to the positioning of said pick up means relative to one of said answer areas, whereby the electromagnetic energy radiated and its respective phase determines which of said indicator means is activated.
2. A teaching apparatus as defined in claim 1 wherein said means for energizing includes a multivibrator having a pair of phase-opposed outputs connected respectively to said two conductive areas.

3. A teaching apparatus according to claim 2 wherein one output of said multivibrator is coupled to said phase comparison means to provide phase reference thereto.

4. A teaching apparatus as defined in claim 3 wherein said phase comparison means includes a switch for each indicator means, a field effect transistor coupled to the output of said pick up means to provide a signal in phase with the output of said pick up means and a signal in phase opposition with the output of said pick up means, one of said signals being coupled to the switch associated with one indicator means and the other signal being coupled to the switch associated with the other indicator means.

5. A teaching apparatus as defined in claim 1 wherein said means for energizing includes a multivibrator having complementary outputs each of mark-to-space ratio of the order of one to ten, said phase comparison means includes a switch for each indicating means and circuit means connected to one output of said multivibrator for periodically energizing each switch for durations insufficient to actuate the indicating means, said output of the pick up means being connected to said circuit means to cause the durations of periodic energization of one of said switches to be lengthened sufficiently to actuate the indicator means associated with such one switch.

* * * * *